J. E. JOHNSON, Jr.
RECOVERY OF VOLATILE PRODUCTS FROM GASES.
APPLICATION FILED JAN. 8, 1912.
1,151,597.
Patented Aug. 31, 1915.
2 SHEETS—SHEET 1.
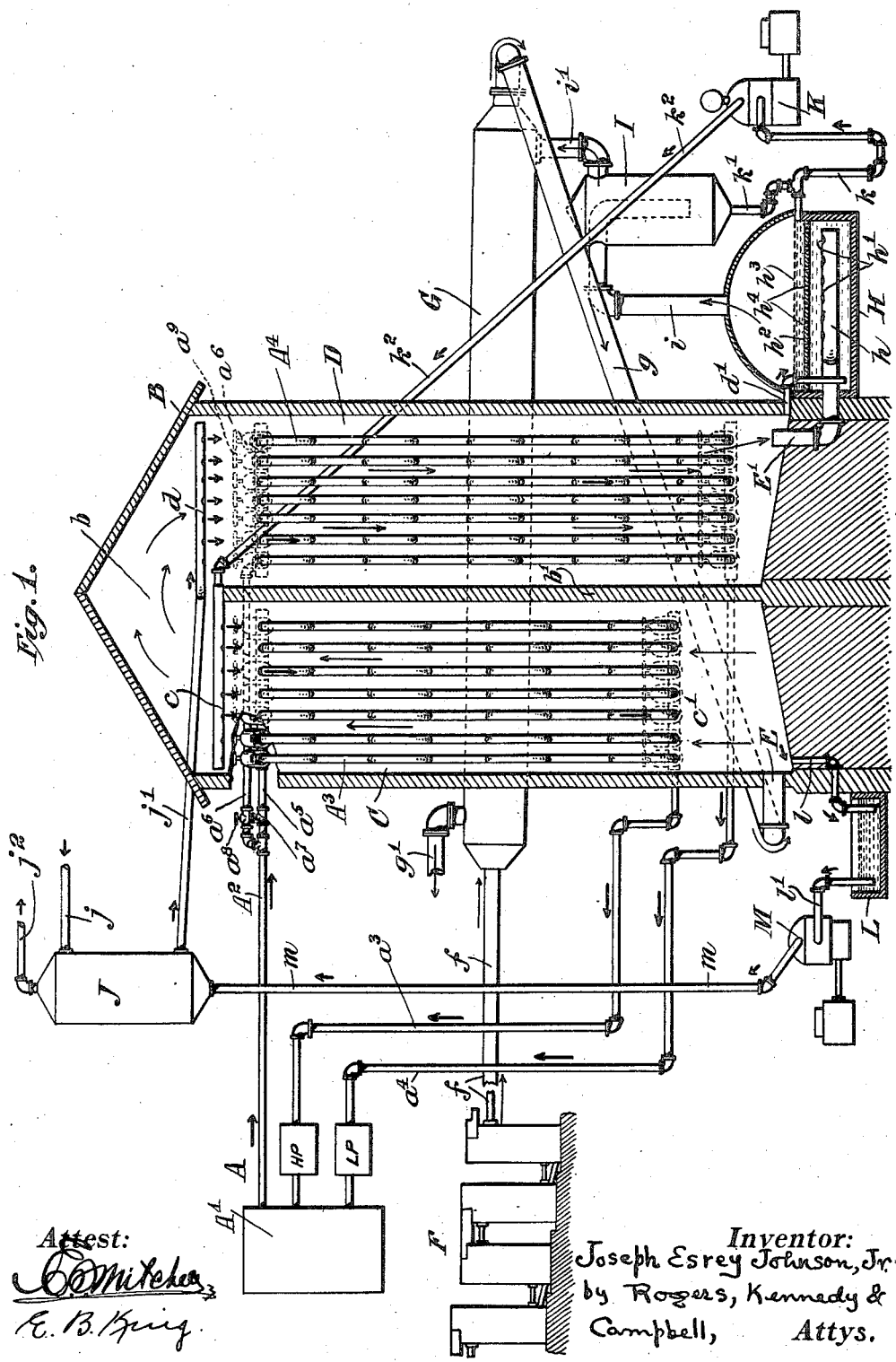
Inventor:
Joseph Esrey Johnson, Jr.
by Rogers, Kennedy & Campbell, Attys.

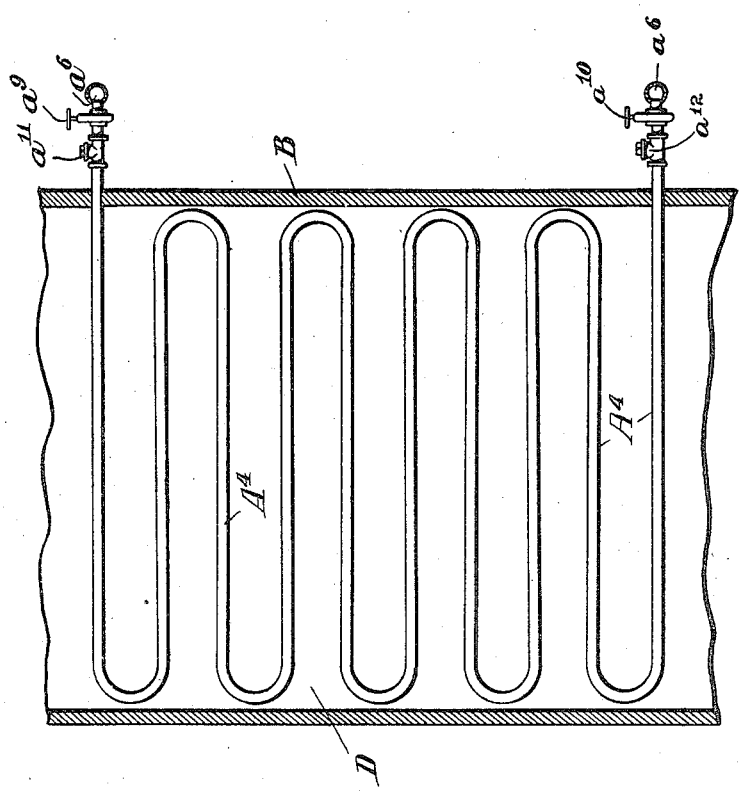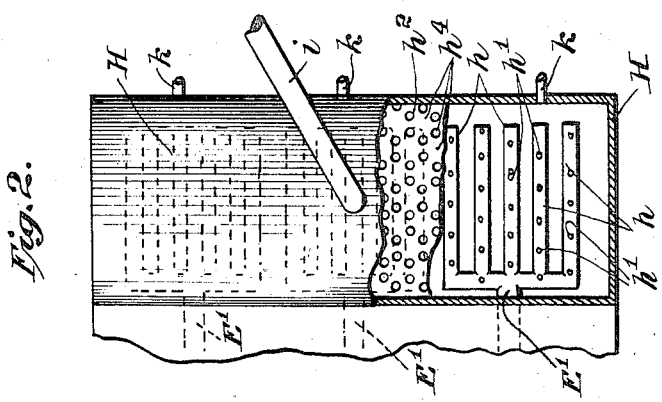

UNITED STATES PATENT OFFICE.

JOSEPH ESREY JOHNSON, JR., OF ASHLAND, WISCONSIN.

RECOVERY OF VOLATILE PRODUCTS FROM GASES.

1,151,597.   Specification of Letters Patent.   Patented Aug. 31, 1915.

Application filed January 8, 1912. Serial No. 670,037.

*To all whom it may concern:*

Be it known that I, JOSEPH ESREY JOHNSON, Jr., a citizen of the United States, residing at Ashland, in the county of Ashland and State of Wisconsin, have invented certain new and useful Improvements in Recovery of Volatile Products from Gases, of which the following is a specification, reference being had therein to the accompanying drawing.

My invention relates to recovery of by-products and particularly to a method of treating certain gaseous products, for example the gaseous products of wood distillation and such as are produced during the manufacture of charcoal; for the recovery of volatile constituents.

Wood distillation for the production of charcoal is accomplished by different methods including what is known as the kiln method and the retort method, during the course of either of which certain gases laden with by-products are formed and pass outwardly from the kiln or retort. Such gases may, for example, be drawn from all of a number of charcoal apparatuses into a single main or pipe in which slight suction may be maintained by a fan or otherwise to assist the flow of the gases. It has been customary to pass the gaseous products through tube or surface condensers kept cooled to a certain degree by the circulation of water which is at as low a temperature as is naturally obtainable, say 55° F., or through spray condensers, or through both. This partially takes out of the gaseous mixture its moisture, tar, ascetic acid and wood alcohol, the residuum of the gases being wasted or burned to produce heat or power.

At will be seen, my invention relates more especially to the treatment of the gaseous products of the kiln process rather than the retort process.

It is a well known fact that in the manufacture of charcoal from a given quantity of wood the kiln process yields very much smaller amounts of by-products than does the retort process with the usual methods of recovery; indeed in all previous practice the yield of wood alcohol from the kiln process would be less than one-half of that where the retort process is used. I have discovered the reason for this to be due to the fact that the vapors constituting the by-products are mixed with a very much larger proportion of air and uncondensable gases in the case of the kiln process as compared with the retort process. As a result of this and of the further fact that the cooling water, as usually employed, merely takes out all above a certain percentage of by-products from each cubic foot of mixture, a much larger proportion of the valuable products pass away with the gases and are wasted in the kiln process as compared with the retort process.

Understanding then that my present invention is directed to securing the material increase of the output of by-products, with the result of a substantial gain and saving, I will proceed to describe its principles and mode of practice.

My invention consists in both apparatus for, and method of, recovery of by-products, as will hereinafter appear more in detail. So far as the invention relates to the method it may be premised that the same is distinguished from the customary method of recovering by-products above referred to, but does not negative the employment of such customary process as a desirable preliminary step. Indeed, I consider it of important advantage to preliminarily employ the present processes or their equivalents, thus economically extracting all that can be in that way extracted, and saving the need of a larger refrigerating plant and greater cost of operation; in other words I propose the present invention to begin operation on the gases or smoke only after the standard plant has reached the limit of its performance. It will also be understood that my invention is useful in connection with either the retort or the kiln process, although as above explained the utility is much greater with the latter, so much so indeed as to render it highly commercially useful with the latter where the commercial advantage would be relatively small with the former.

By experiment, observation and deduction I have ascertained the following facts or principles, upon the bases of which I have made the present invention and I believe the results attained by my invention are due to them. Let us say that in distilling a cord of wood 100,000 cubic feet of gas result. Now that volume of gases if saturated with alcohol while at 32° F. would contain about 31 gallons alcohol. In practice, however, and even at ordinary temperatures, the gaseous products contain actually much less alcohol than that, for the reason that the water vapor in the original gases or smoke, upon condensing, carries down with it a large proportion of alcohol, due to there being a strong affinity of the water for alcohol. There is still however much alcohol carried with the gases, and it necessarily exists in a superheated condition since its density is less than the density corresponding to saturation at the given temperature. If these gases containing alcohol be scrubbed with water containing alcohol two opposite forces or tendencies exist. By scrubbing I mean bubbling or washing or equivalently intimately intermixing the gases and liquor. The unsaturated gas may be said to endeavor to take up alcohol from the water to the point of saturation. On the other hand the water through its affinity for alcohol tends to absorb more alcohol from the gases. The result, under any given conditions, will be to eventually establish a balance of these opposing forces. I have found, for example, that at certain temperatures kiln gases when scrubbed with pure water will yield a mixture containing 5% of alcohol, whereas if the scrubbing were done with liquor containing 8% alcohol, there would be a reversal, and the liquor reduced to nearly a 5% mixture. Therefore 5% approximately indicates the balance for such conditions, and any different mixture will restore itself to this basis. Also I have found that upon lowering the temperature two results follow. First, the affinity of the water for alcohol is enhanced. Second, the capacity of a given volume of gas for alcohol vapor at any given percentage of saturation is rapidly reduced, so that scrubbing can more easily remove it.

With my invention, in one aspect, I propose to utilize the principles described, to attain the objects recited, by the employment of external artificial refrigeration. In a fuller aspect, my invention contemplates artificial refrigeration performed in connection with scrubbing, and especially scrubbing such that finally the gases, before going to waste, contact with water low in or free from alcohol. I believe I am the first to do these things, and the first thereby thoroughly and economically to recover the by-products.

Referring first to the broader aspect of my invention it may be said to consist in treating the gases containing the by-products by externally applying artificial refrigeration thereto so as to reduce the temperature to such low point as is practically available only by artificial refrigeration, (especially in the summer season), and in an apparatus by which this is performed; through which method and apparatus the practically complete removal of alcohol and the other by-products is assisted so as to greatly enhance the gain and saving, and therefore the value of a given plant. The expense of installing and maintaining the additional apparatus necessary will be much more than offset by the additional yield of valuable products. In some cases also certain products will be recovered which without my invention would never be separated from the gases with which they are mixed. Thus materials valuable to humanity are saved from being swept away with the waste gases and destroyed.

By artificial refrigeration I refer substantially to refrigeration by a standard plant such as the ammonia compression machine or the ammonia absorption machine, or other well known refrigerating machines such as that known as the carbonic acid machine, or other similar external refrigerating means. I prefer the ammonia compression machine and when used this is capable of application in two ways in the practice of my novel methods. Thus the ammonia may be either expanded within pipes or other containers outside of which the products to be treated are directly passed, or on the other hand the expanding ammonia may first be employed to refrigerate brine and then the brine circulated in pipes, about which pipes the products to be treated are passed. Of these I prefer the first, which may be referred to as the direct expansion system because it reduces the cost of piping and increases the refrigerating effect by reducing losses so that the expense of power and operation are reduced.

I do not claim the employment of internal refrigeration *per se*, for example by compressing the gases, cooling and then expanding them, since I find that to be impracticable for several reasons, partly in that such refrigeration is extremely wasteful and inefficient, but also in that it would not permit the full use of my method and incidentally because the acetic or other acids are bound to form and cause corrosion of the interior of the apparatus to its great detriment.

Referring next to the fuller aspect of my invention it may be said to consist in performing two steps in connection with each other, or simultaneously, namely artificial refrigeration of the gases and their scrubbing with water under proper conditions; for example where alcohol is to be removed the scrubbing liquor will be maintained substantially pure or in a condition having capacity to effectively absorb. By thus combining artificial refrigeration (to a reasonable degree) with a thorough scrubbing with water (of low alcohol content in the final out-passage of the gases) virtually a complete recovery of alcohol can be made without either excessive first cost and maintenance for refrigeration or the need of an excessive amount of scrubbing water.

The feature of externally refrigerating *per se*, while valuable, and permitting my most important combined method, would alone be often impractical, because it is seen that the amount of refrigeration required would be so enormous as to commercially preclude it. On the other hand the scrubbing alone would be absolutely impractical. We have above seen how little alcohol will be absorbed by water, and it can be said that after the standard condenser is through with the gases only a small further yield would be possible by scrubbing at ordinary temperatures. Consequently an enormous quantity of water would be required to effect appreciable further removal of alcohol, so great indeed as to make the attempt commercially unsuccessful. Moreover it is not a mere question of water required, but the losses occurring in the rectifier or still, for all the water must there be heated to a high temperature to drive off the alcohol. Excessive heat consumption, therefore, per unit of alcohol recovered, is occasioned.

I have above described my invention so far as it is embodied in a method or methods, such description being in a general or generic form, and specifying certain of the preferred features or details. The further details and other preferred features of my method will hereinafter appear, in connection also with the disclosure of one particular form of apparatus which may be employed for carrying out the same, said apparatus also constituting an instance or embodiment of that part of my invention which refers to the means rather than the method for recovery of by-products.

In the drawings accompanying and forming a part of this specification, Figure 1 represents to a certain extent conventionally or diagrammatically, and generally in elevation, one form in which my invention may be carried out or embodied. Fig. 2 is a partial top view with parts broken away for the purpose of showing the interior construction of the scrubber shown in Fig. 1. Fig. 3 is a right-hand elevation of one of the ammonia coils within the refrigerating chambers showing a convenient shape of coil and also showing its preferred relation to the walls of the housing.

As the heat exchangers and certain other parts of the illustrated apparatus are well known, the illustrations will be amply sufficient to enable one skilled in the art to construct and practice my invention.

Similar letters of reference designate corresponding parts in the several figures of the drawings.

A refrigerating apparatus of the ammonia compression type is illustrated only conventionally in the drawings at A, this being of the two cylinder type, the high pressure and low pressure compression cylinders being indicated by HP and LP respectively, and the condenser by A'. Liquid ammonia is conducted through the pipe $A^2$ from the refrigerating apparatus to the several expansion coils $A^3$ in the first refrigerating chamber and the similar coils $A^4$ in the second refrigerating chamber. It will be understood that the liquid ammonia vaporizes within the expansion coils, thereby extracting heat from whatever surrounds the coils; and the vapor thus produced is returned to the refrigerating machine by a pipe or preferably two pipes $a^3$, $a^4$, each one leading from the expansion coils of one chamber.

The pipe $A^2$ is shown as having separate branches $a^5$ and $a^6$ for chambers C and D respectively, with separate expansion valves $a^7$ and $a^8$ therefor, so that the pressures may be regulated within coils $A^3$ and $A^4$ respectively and thereby the suctions of cylinders HP and LP respectively. A housing B may be employed to contain the chambers within which are the expansion coils, and said housing may be of any desired form and construction to accommodate the chambers, and to prevent passage of heat thereinto. A convenient shape of ammonia coil is shown in Fig. 3, also its connection with branch $a^6$. Gate valves $a^9$, $a^{10}$ are shown above and below, and tees $a^{11}$, $a^{12}$ which may be opened when the valves are closed for cleaning or blowing out any of the tubes. The removal of any tube is thereby also permitted, the front of the housing being openable for that purpose.

I propose as one feature of the present improvements to employ not a single chamber, but two coöperating chambers through which the gases containing by-products are to be passed in succession. The first of these chambers C may be designated the high temperature chamber, and the chamber D the low temperature chamber. It will be seen that the pipe A conducts liquid ammonia to both of the chambers C and D, and that both of said chambers contain expansion coils so that both of them will have their contents refrigerated by the action of the ammonia expanding in said coils. The vaporized ammonia from the foot of chamber C passes out by pipe $a^3$, and that from chamber D by the pipe $a^4$ as already stated. The gases are to be passed successively through chambers C and D in this embodiment of my improvements, thus dividing the refrigerating action into two stages and producing a given degree of refrigeration with far less power and expense both for plant and operation. In conjunction with this arrangement I employ in the refrigerating machine two separate compression cylinders, the pipe $a^3$ leading to the first of them, and the pipe $a^4$ to the second of them, and both of said cylinders discharging into a common ammonia condenser A', which latter supplies liquid ammonia as already stated to both of the sets of expansion coils, one of which may be at a higher, the other at a lower, pressure. A gas inlet E such as is illustrated may admit gases containing by-products to the lower part of the chamber C and the gases ascend through chamber C and out at the upper end thereof, through a passage $b$ formed in the housing or otherwise, and thence downward into chamber D traversing it from end to end, and finally having its exit from the lower part of chamber D through a series of gas outlets E' whence the gases with whatever remains in them of by-products are conducted for such further operations as are described hereinafter.

Within the chamber C the gases might for example be cooled from atmospheric temperature, say 70° F., down to 45° F.; and in chamber D they may subsequently be further cooled from 45° down to 20°. By thus making the refrigerating take place in two stages a considerable portion of the heat is enabled to be extracted in chamber C by a refrigerating substance at a temperature, for example, of 35°, while in chamber D a refrigerating temperature of about 10° would be needed. This desirable result is effected with the production of greater efficiency and saving in power by the employment of the two separate chambers C and D with the separate compression cylinders to which the pipes $a^3$ and $a^4$ lead, the respective pressures in said cylinders determining the pressures and therefore the temperatures within the coils in the two chambers. In indicating a division into two stages it will be understood that the number might be increased to more than two if desirable. At this point it should be explained that the gases entering the chambers in the housing B consist of gases or smoke which have issued from condensers of the heretofore known types. Such gases or smoke therefore have had removed as much of their volatile contents as is possible to be condensed under ordinary conditions. I have conventionally illustrated at F a portion of a series of condensers which may be considered as representing the present known type of condensing apparatus, these having for example sprays of water through which the gases pass, or chambers containing tubes through which water passes, or preferably the tubular or surface condenser followed by the spray condenser, the water in all cases being at ordinary or natural temperature. The remaining gases with whatever volatile by-products are contained in them, leave the condensers F through connections $f$, which lead them into a countercurrent regenerator or heat exchanger G. The construction of such a regenerator is well known and need not be described further than to explain that the gases in passing through from end to end are brought into close proximity to other gases passing in a reverse direction so as to effect an interchange of heat as far as possible.

The gases from pipe $f$ passing through regenerator G are preliminarily refrigerated from the outgoing gases, and the incoming gases pass then by pipe $g$ to the gas inlet E already referred to. Thus the gases partly refrigerated enter the first refrigerating chamber C passing up through it as indicated to the top, thence passing around through the connecting passage $b$ above the partition $b'$ separating the two chambers, and thence downward through the second refrigerating chamber D, from the bottom of which the gases pass out through the several outlets E' into a scrubber H of a particular construction wherein the gases are thoroughly washed preferably in a peculiar way hereafter to be described. From the top of the hood of the scrubber, the gases pass out through pipe $i$ to a mist separator I, such for example as of the type employed to remove the water from exhaust steam. From the outlet $i'$ of the separator the refrigerated and scrubbed gas passes into the regenerator G and traverses it from end to end, taking heat in the course of its passage from the entering gases as already explained. Finally the gases pass out of the regenerator by exit $g'$ whence they are taken to the burners to be burned or otherwise finally disposed of, being by the passage through the regenerator warmed and constituting better fuel. This completes the description of the circuit of the gases or smoke from the heretofore used condensers to the final exit or waste outlet.

I will now describe the circuit of the water or liquor employed in my novel apparatus, and at the same time will set forth the preferred construction of the scrubber which effects the washing of the gases in connection with air refrigeration. It will be perceived that the liquor circuit is what is known as a closed circuit, the solution circulating through the system over and over again with only such minor additions or subtractions as are necessary to maintain the proper conditions in the apparatus. I prefer that the water employed for scrubbing purposes herein shall contain in solution proper substances for preventing its freezing at the lowest temperature liable to be reached in the operation of my invention.

In describing the liquor circuit it must be borne in mind that all of the liquor is treated in a rectifier or still wherein heating is performed for the purpose of driving off the alcohol and other contents. After treatment in the still the liquor returns with the alcohol and other by-products removed. My invention has no reference to the rectifier *per se* and that is not illustrated in the drawings, although pipes leading thereto and therefrom are indicated. The liquor returning from the rectifier through pipe $j$ is passed through a counter-current exchanger J which generally speaking will be similar or analogous to the exchanger or the regenerator G, and in the course of its passage therethrough the liquor entering warm from the rectifier will have its heat largely abstracted by the cold liquor from the refrigerating chambers passing through the regenerator J in the opposite direction. From the exchanger J the liquor now free from alcohol, etc., passes through pipe $j'$ to a spray or sprays $d$ at the top of the second or colder refrigerating chamber D. This chamber being full of refrigerating coils, the sprayed liquor will pass through the chamber and have its temperature depressed to the coldest point existing in the apparatus. Incidentally the liquor passing over the ammonia coils in chamber D keeps the coils moist with alkaline liquor and thus protected from corrosion by the gases, and as a further incident the liquor during this passage may absorb a small amount of alcohol or other by-products from the gases, although this quantity would be inconsiderable and of no importance for reasons that will shortly appear. By the presence of the liquor on the surface of the ammonia coils it acquires the temperature of the coils and assists in the transfer of heat from the gases to the coils. The liquor on reaching the bottom of the chamber D passes out of it through the drain $d'$ into the scrubber H, the ends of the pipe $d'$ being submerged in the scrubber to prevent the escape of gas through said pipe. In the scrubber the gases entering by pipe E′ are caused to be thoroughly washed.

I will interrupt the description of the course of the gases, to describe the construction of the scrubber which is shown in cross-section in Fig. 1 and in top view in Fig. 2, broken away to show the interior. There may be three or more gas pipes E′ entering the scrubber below the water level, and each of them divided into a number of branches with perforations so as to distribute the gases as evenly as possible in order that in bubbling up through the liquor the body of gas may be separated and maintained separated into the smallest possible portions or bubbles. In Fig. 2 one of the pipes E′ is shown, it having a plurality of horizontal branches $h$ and each of the branches having a number of perforations $h'$, the arrangement of perforations as a whole being preferably a hexagonal or diagonal arrangement. Immediately above the pipes E and branches $h$ thereof, is a perforated plate $h^2$, this being preferably two or three inches below the surface $h^3$ of the liquor so that the gases passing through the perforations of plate $h^2$ will have to bubble up through two or three inches depth of liquor above the plate. The perforations $h^4$ in plate $h^2$ are preferably one-quarter inch holes spaced in hexagonal order with about three-quarters of an inch between centers, whereas the apertures $h'$ in the branches therebeneath will preferably be about three-quarter inch holes spaced from four to six inches apart. By this arrangement the apertures $h'$ preliminarily break up the body of entering gas and distribute it in comparatively large bubbles substantially evenly throughout the liquor, such bubbles thereupon rising in even order and being efficiently and uniformly broken up by the smaller and more closely spaced apertures $h^4$ so that the formation of large bubbles is prevented, and on the contrary thorough washing or scrubbing is secured. It will be seen that the scrubbing liquor enters the scrubber at the lowest temperature of the system and practically free of alcohol, so that it is in the best possible condition to scrub from the cold gas the final traces of alcohol vapor which it contained; the scrubbing being done at the lowest temperature of both gas and liquor, a necessity for complete recovery of the alcohol.

Resuming now the description of the liquor circuit, it is preferred that liquor be constantly drawn from the scrubber H by pipe or pipes $k$, for example located at such a level as to maintain the surface of liquor in the scrubber at the height $h^3$ shown. The separator I may be drained by a pipe $k'$ leading to pipe $k$, the latter pipe in turn leading to a force pump K which causes the circulation of the liquor, forcing it by the pipe $k^2$ upwardly to a spray $c$ located at the top of the first refrigerating chamber C, whence the liquor is sprayed and passes down through the chamber in contact with the ammonia coils and also with the freshly entering gases, removing from them a large portion of their alcohol and other contents.

From the above description it will be seen that the scrubbing liquor while it is fresh and free from alcohol, etc., is first employed under most advantageous temperature conditions for extracting the final alcohol contents from the gases in their last outgoing stage, the same liquor thereafter, having only a relatively small quantity of alcohol, etc., being applied to the richer incoming gases to extract from them all that is possible under the conditions existing in chamber C. This contributes to the complete recovery of the alcohol with the smallest possible quantity of scrubbing liquor.

It will be noticed that in chamber D the ammonia coils extend substantially the entire vertical length of the chamber, whereas in chamber C the lower terminæ of the coils and the outlet pipe $a^3$ are somewhat elevated to leave a space $c'$. The action in this space is one solely between the outgoing spray of liquor and the incoming gases, such action serving to bring the two into intimate contact, and serving also to a certain extent to effect an exchange of heat, the outgoing spray liquor absorbing heat from the gases before they reach the refrigerating coils, so saving refrigeration and raising the temperature of the outgoing liquor on its way to the exchanger and still. At the bottom of chamber C the liquor collects and passes out through pipe or pipes $l$ into a tank L, the end of pipe $l$ being submerged to prevent the escape of gas and said tank serving to temporarily collect the rich liquor for any treatment desired to be had before it passes to the rectifier. For example, there will be a substantial quantity of acetic acid in the liquor at this stage to injure the iron pipes employed, and to offset this I maintain the solution quite strongly alkaline by adding quick-lime, caustic soda or other suitable alkali, the tank L well serving for this purpose. The alkali may be constantly added in liquid or other form and stirred if desired. The rich liquor is pumped from the tank L through pipe $l'$ by a force pump M which drives the liquor upwardly through pipe $m$ into the regenerator J. The regenerator is traversed by the cold liquor which absorbs heat from the warm liquor incoming from the rectifier as already explained, and the rich liquor thus warmed up as far as possible, passes out of the regenerator through pipe $j^2$, whence it passes to the rectifier or still to be heated for driving out of it the alcohol and other volatile contents; after which the liquor freed from alcohol, etc., is returned to the regenerator J by pipe $j$ as at first explained, thus completing the closed liquor circuit.

It will be seen that I have enabled the extraction in two (and there might similarly be more) stages. In the last stage the gases come with but little left of alcohol, etc., the liquor is practically free thereof or "fresh," while both are refrigerated to the coldest temperature of the system. The result is that the gases are under the best conditions for giving up the balance of their contents, the liquor is under the best conditions of temperature for absorbing further alcohol, and the liquor being fresh or free of alcohol has a maximum affinity for it. Whatever passes away with the gases after these operations in the scrubber can be said to be commercially impossible of recovery. In the first stage of extraction the conditions differ somewhat. The gases are richer in alcohol, the liquor from the scrubber already has take up some alcohol but is in condition to take much more from rich gas, the gases are partly refrigerated and quite ready to give up a large part but not all their contents, while the liquor is at an extremely cold temperature, which renders it more receptive. If intermediate stages be employed the conditions also would be intermediate those stated.

The conditions of heat and cold are the least wasteful, and minimum refrigeration is required in my invention. The cooling of the gases in the first chamber not only aids the extraction of their contents therein, but serves also as a preliminary step to the greater cooling in the second chamber. The gas and liquor regenerators are enabled to be effectively employed to conserve large amounts of energy. The entire apparatus is simple of construction and of low first cost, easy of operation and maintenance, and of great effectiveness for its purposes.

In the claim herein while particular terms are used to refer to the different steps and different parts of the apparatus, it is intended that each shall include equivalents, and I do not intend to impose any limitations upon my improvements except such as are specified in the claim, as many obvious modifications may be employed without departing from the substance of the invention.

What I claim and desire to secure by Letters Patent, is:

The improvement in the art of recovering from the gaseous products of wood distillation, after their treatment by scrubbing and cooling with natural means, their volatile products including wood alcohol contained therein, which consists in the following method namely: subjecting the waste gases, after said treatment, to artificial refrigeration by contact with surfaces refrigerated by the ammonia compression system at a temperature substantially lower than obtainable by natural means, and scrubbing them while so refrigerated with artificially refrigerated liquor constantly supplied afresh, such artificial refrigeration being applied in two stages, the freshest liquor being first used to scrub in the second stage at the lowest temperature and then passed to the first scrubbing stage, for scrubbing the gases at a less low temperature; such liquor after such scrubbing being passed through a regenerator to raise its temperature, thence through a rectifier for the separation of the desired products, thence through said regenerator reversely to lower its temperature, and thence to the refrigerating and scrubbing points.

In testimony whereof I affix my signature in presence of two witnesses.

JOSEPH ESREY JOHNSON, Jr.

Witnesses:
 Wm. J. Dolan,
 E. B. King.